Figure 5:
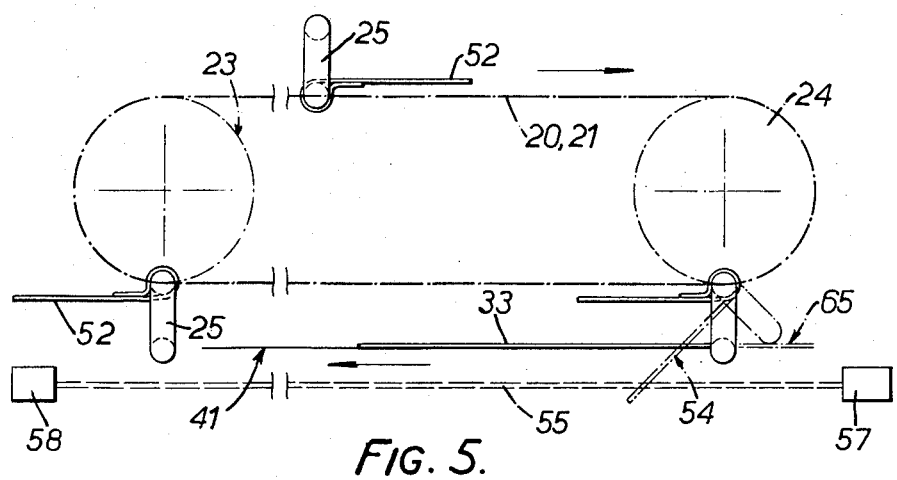

United States Patent [19]

Wood

[11] 3,801,780
[45] Apr. 2, 1974

[54] FAULT DETECTION SYSTEMS FOR CONVEYORS

[75] Inventor: David Wood, Clevedon, England

[73] Assignee: Masson Scott Thrissell Engineering Limited, Bristol, Great Britain

[22] Filed: Nov. 6, 1972

[21] Appl. No.: 303,944

[52] U.S. Cl. .......................... 250/223 R, 250/237 R
[51] Int. Cl. ............................................. H01j 39/12
[58] Field of Search ........... 250/221, 222, 223, 237, 250/219 S, 219 DF; 209/111.7; 198/232; 226/11, 43, 44, 45

[56] References Cited
UNITED STATES PATENTS

| | | | |
|---|---|---|---|
| 2,233,483 | 3/1941 | Metcalf | 250/219 S |
| 2,725,972 | 12/1955 | Howdle | 250/223 R |
| 2,834,450 | 5/1958 | Govin | 250/223 R |
| 3,219,829 | 11/1965 | Reist | 250/223 R |
| 3,433,966 | 3/1969 | Letch | 250/223 B |

Primary Examiner—Archie R. Borchelt
Assistant Examiner—D. C. Nelms
Attorney, Agent, or Firm—Young and Thompson

[57] ABSTRACT

A conveyor for carrying documents or envelopes comprising an endless flexible belt provided with spaced carriers in the form of metal rods with multiple bends moving along ribbed or grooved supporting surfaces, the belts being also formed with spaced teeth to engage toothed driving sprockets, so that the positions of the conveyed articles are accurately determined. Below the supporting surface sorting boxes are located each with a diverter gate movable into the path of the travelling articles, and a number of such conveyors are positioned end-to-end to transfer mail from one to the next. Each of the carrier rods can twist about its axis and has an opaque blade at one end arranged to interrupt a light beam and so produce an optical signal to stop the conveyor if an item of mail becomes jammed.

6 Claims, 6 Drawing Figures

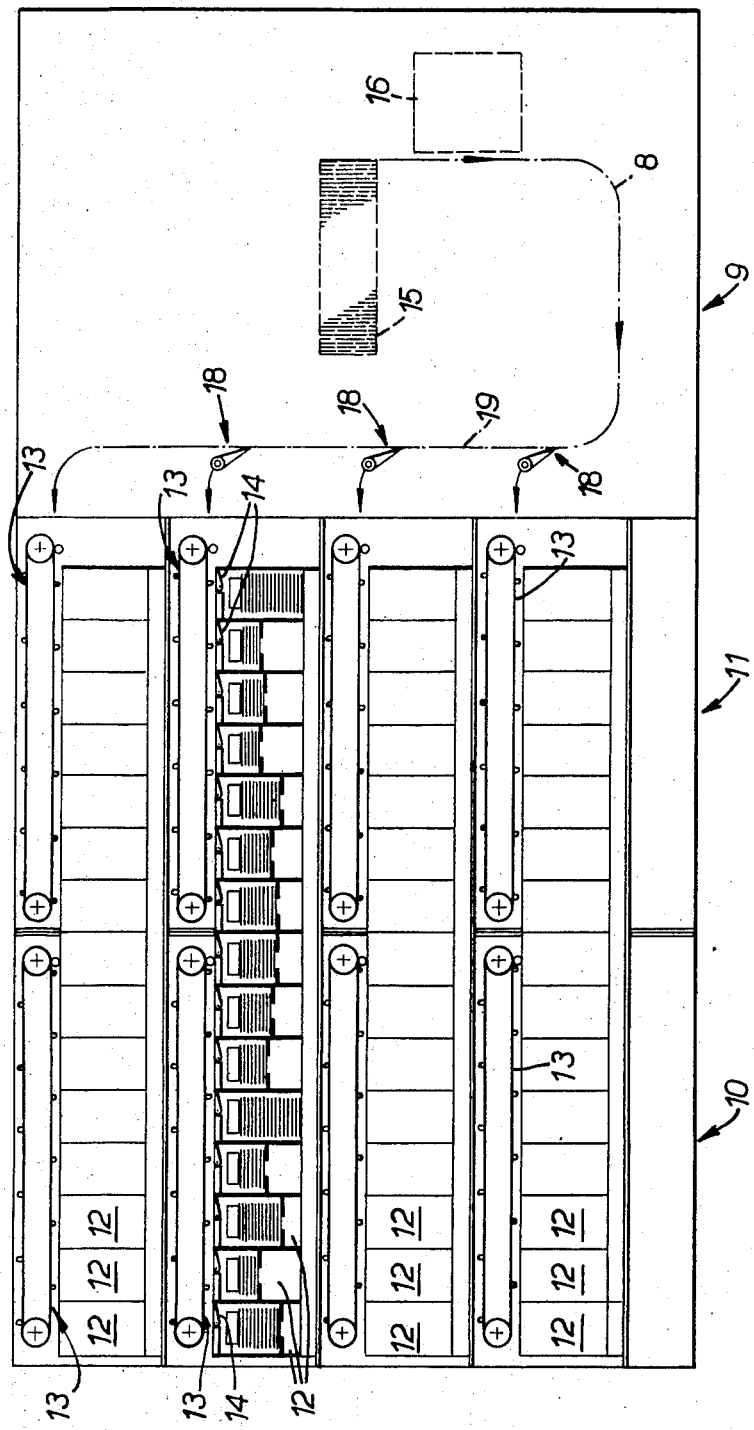

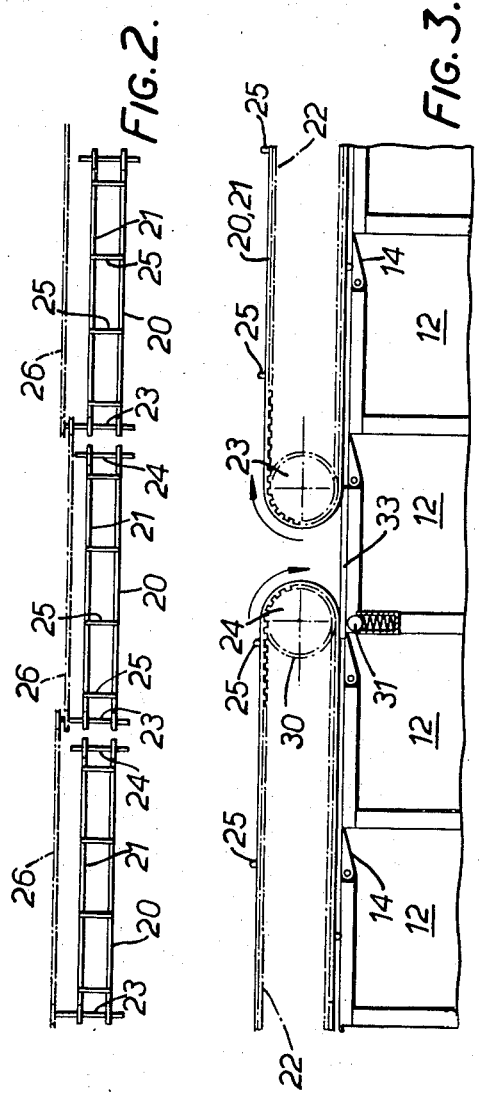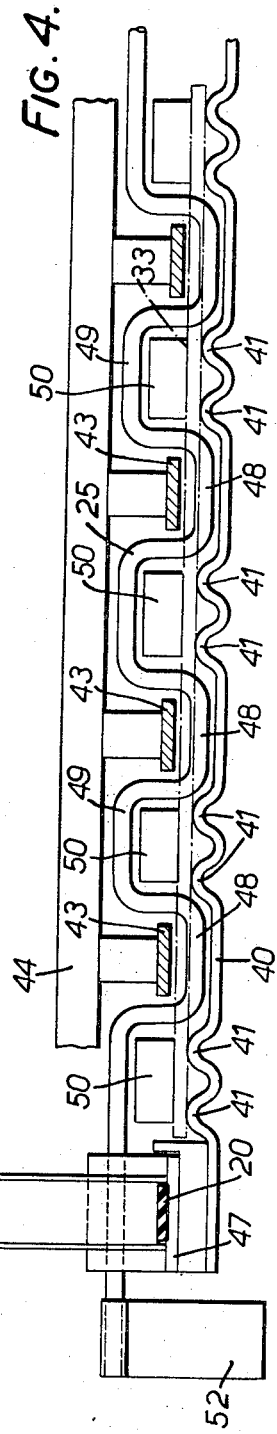

FAULT DETECTION SYSTEMS FOR CONVEYORS

This invention relates to apparatus for detecting faults, failures, or malfunction of any selected parts of components of an endless conveyor, and is particularly though not exclusively applicable to endless conveyors designed for conveying documents through a document sorting machine.

One of the difficulties experienced in any fault detection system for an endless conveyor, particularly one having a number of article handling devices spaced around its length, is that a corresponding large number of fault detection elements are necessary when relying upon normal detection systems. Moreover conventional fault detection systems are themselves somewhat prone to faults owing to the large number of detection elements required and the continuous relative movement of these elements while the conveyor is running.

Accordingly it is an object of the invention to provide an improved detection system which may at least partly reduce some of these problems and disadvantages.

Broadly the invention consists in a fault detection system for an endless conveyor having a substantially straight section, including an optical projector arranged to project a beam of light along and close to the path of the conveyor in this section, an optical receiver for receiving the beam, and means for producing an output signal when the beam is interrupted, or vice versa, and a number of optical impeders arranged to move or lie close along the path of the beam, and each arranged to be actuated between beam obstructing and non-obstructing positions, in response to movement of a part of the conveyor resulting from some fault, failure or malfunction thereof.

Thus it will be seen that a considerable number of components or sections of the conveyor can be kept under surveillance by a single optical projector and optical receiver, and moreover the optical impeders are not liable to wear or mechanical friction so that the chances of failure in the detection system itself are relatively small.

The invention is of particular advantage when applied to a document handling conveyor for a document sorting machine including a number of pre-fabricated modular units each including a number of sorting positions at different levels, conveyor systems for moving the articles through the respective unit at each level, and deflector gates for deflecting articles into selected positions, the modular units being designed and arranged to be coupled together in varying numbers to form sorting equipment of varying capability, and each modular unit including a conveyor section which can be coupled to and synchronised with a conveyor section in the next module, by means of a synchronising drive. In such a machine it is convenient to provide a separate optical unit for each module of the conveyor, so that each conveyor module is completely self-contained with its own detection unit. The documents are transferred from one conveyor to the next at the junctions between modules and in this way a conveyor of any required length can be built-up simply by adding further modules.

The optical impeders are preferably movable with the conveyor and in a particular preferred construction the optical impeders are each attached to a movable pusher member on the conveyor, for transporting one of the articles to be conveyed.

Figure 6:
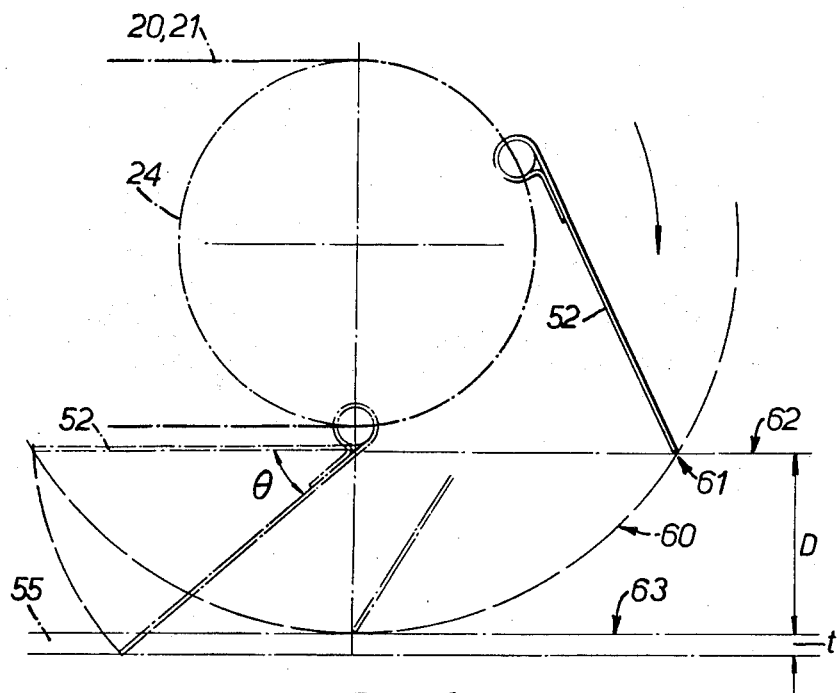

The invention may be performed in various ways and one particular embodiment, with some possible modifications, will now be described by way of example with reference to the accompanying drawings, in which:

FIG. 1 is a diagrammatic side elevation illustrating the main components of a letter sorting machine to which the invention may be applied, FIG. 2 is a diagrammatic plan view on an enlarged scale showing a series of conveyor belt sections of the machine of FIG. 1, arranged end-to-end to form an extended conveyor, FIG. 3 is a side elevation on a somewhat enlarged scale showing in more detail the construction of the transfer device for moving documents between adjacent conveyor sections, FIG. 4 is a diagrammatic end view on an enlarged scale, and partly in section, showing a portion of one of the "comb" type pushers carried by the conveyor belts, FIG. 5 is a diagrammatic side elevation illustrating a fault detection system incorporated in the conveyor, and FIG. 6 is a diagrammatic view, corresponding to part of FIG. 5, on a further enlarged scale, the operation of the detection system of FIG. 5.

Referring first to FIG. 1 the machine consists essentially of an input section 9 combined with a conveying and sorting section consisting of a series of sorting modules. In this illustrated example there are only two modules 10 and 11, but any desired number may be provided, and further modules can be added without difficulty to an existing system. The input section 9 may be of generally conventional design and construction, and may include an automatic "letter facing" unit (not shown) followed by a manual or automatic coder or decoder 16. In a manual system the envelopes are presented in succession before an operator at a key board who types appropriate code symbols into the envelope, in a form in which they can subsequently be "read" by an automatic reader such as 16. In the alternative automatic system as illustrated the envelopes carry pre-printed code symbols and are fed by a stepping conveyor 15 direct to the automatic reader 16. From the "reader" 16 the envelopes are automatically fed in succession into a belt conveyor 8 which transfers them to a vertical conveyor 19, from which they are selectively diverted by solenoid-operated diverter gates 18 into any selected one of (say) 4 levels. At each level a further conveyor system 13 is arranged to convey the envelopes horizontally away from the starting point, and in doing so the letters pass a series of diverter gates 14 which control the selective delivery of letters into the individual sorting boxes 12. The gates 14 and 18 are controlled in known manner by the automatic reader 16. The conveyor systems 13 are of the positive-positional type, with positive carrier members at fixed intervals along the conveyors. The conveyor 8, particularly if of any great length, may also be of the positive-positional type.

In normal existing sorting machines of this general type the conveyor belts extend horizontally the full length of the machine and are liable to a considerable degree of "stretch," which can cause inaccuracies in the speed and location of envelopes and consequent incorrect sorting.

In this example of the invention the problem of "stretch" in the horizontal conveyor belts 13 is avoided by building up these conveyors from a number of shorter sections, as illustrated more clearly in FIGS. 2 and 3. Each conveyor section 13 extends for the length of one of the modules 10, 11, etc., and each comprises a pair of parallel flexible belts 20, 21, formed with teeth 22 on one side to permit the belt to be driven and accurately indexed relative to a toothed driving sprocket 23 at one end. The sprocket 24 at the other end is not driven, but the sprocket bearing is resiliently sprung away from the first sprocket to hold the belts 20, 21, taut. The other (external) surface of each belt is provided with a series of spaced pusher elements (indicated at 25 in FIG. 3) to engage and transport the individual envelopes, and details of one preferred pusher element are described in more detail below with reference to FIG. 4.

As shown in FIG. 2 the driving sprocket 23 of each belt section 13 is driven through a multiple driving chain system comprising a series of chain loops 26, positively interconnecting the shafts of the sprockets 23, so that all rotate in synchronism. Alternatively the sprockets 23 may be driven through a suitable gearing from a continuous longitudinal driving shaft, preferably so designed and arranged that there is little if any lag or stretch between one end of the machine and the other. As a result if there should be any slight stretch in an individual belt length the out-of-phase error will be corrected or restored at the next belt section so that the overall or cumulative error is accordingly reduced, particularly at the last section.

FIG. 3 illustrates the preferred system for transferring documents between different modules 10, 11, etc., and designed to maintain the accurate timing or positioning of the letters as they proceed from one module to the next. Each letter is slightly accelerated at the moment of transfer to avoid any undesirable interaction between the edges of the letter and the adjacent pusher elements 25 on the adjacent sections of conveyor belt.

For this purpose the shaft of the sprockets 24 on the "downstream" side of the module junction has three drums 30 symmetrically spaced across the width of the conveyor. The diameter of each drum 30 is such that its peripheral speed is slightly greater than the conveyor speed, and each drum is provided at one part of its surface with a recess (not illustrated) to allow the pushing elements 25 to pass freely around the drive pulley or sprocket. Vertically below each drum is a pressure roll 31 resiliently sprung upwards and cooperating with a pre-set stop to provide a minimal gap slightly less than the normal thickness of a letter. Thus three driving "nips" are formed between the drums 30 and rolls 31, capable of driving the letter 33 through the transfer stage even without the assistance of one of the pusher elements 25. The pre-set roller gap or "nip" assists in obtaining a positive pick-up and prevents the pressure rolls 31 from entering the slots in the drums. At the point of transfer the normal drive to the letter is lost, but the acceleration of the letter also serves the useful purpose of advancing the letter during this instant.

After the letter has been ejected from the "nip" into the next conveyor section (i.e., to the left in FIG. 3) it is slowed down by friction until the following pusher bar 25 regains control immediately after, and accurate timing is completely restored. A projecting platform or rail from one module lines up with the bed or static conveyor platform of the adjacent module so that the letters can travel horizontally without interruption from one module to the next.

The preferred pusher bar system is illustrated in FIG. 4. The moving conveyor belt cooperates with a static supporting system or "dead plate" 40 formed with a number of longitudinally extending spaced ribs or rails 41, interrupted as necessary along the length of the machine to permit the letters 33 to be diverted downwards into the sorting boxes or cassettes 12 by the diverter gates 14 which are positioned in line with these rails 41 across the width of the conveyor. Cooperating with the rails 41 of the dead plate 40 are a series of elongated spaced top guides or rails 43 carried by overhead supports 44 and providing sufficient clearance from the dead plate for the individual letters 33 and pusher bars 25 to travel along the length of each module 10, 11, as necessary.

Each pusher bar 25 is an undulating metal rod, pivotally mounted at each end in a support pad or bearing 47 carried by one of the two operating belts 20, 21 of the conveyor, one on each side. The pusher rods 25 are spaced apart along the length of the belt at predetermined intervals, related to the standard size of the envelopes and to the intervals of the teeth 22 on the belt. In the example illustrated in FIG. 4 the undulating rod 25 has lower depending loops 48 which lie respectively between one of the top guides 43 and the dead plate 40 and intervening upward loops 49 which provide gaps or clearance where the tips of the diverter gates are raised above the level of the envelopes. Each diverter gate 14 may for example comprise five parallel fingers 50 arranged to rock together about a horizontal axis, and spaced across the width of the conveyor to engage across the whole length of the edge of an envelope. The undulating pusher bar 25 has a corresponding number of loops 49 to accommodate these diverter fingers.

In this particular system the letters are arranged to be conveyed individually, each lying horizontally flat on the conveying surface with its larger dimension or length across the conveyor. This has several advantages compared with more normal systems in which the letters are conveyed in other attitudes. If the individual letters lie horizontally flat on the conveyor surface with their larger length parallel to the direction of movement the speed of the conveyor must be increased to achieve any specific sorting rate or the sorting rate must be reduced. Also the overall length of the machine must be undesirably increased. If alternatively the letters are conveyed in vertical attitudes, i.e., in parallel vertical planes, the dimensions and speed of the conveyor can be reduced for any specific sorting rate, but other problems arise in transporting and diverting envelopes to and from the conveyor.

Each undulating bar 25 is torsionally sprung in its pivot mounting, against a limit stop, such that its normal position is in a generally vertical plane as shown in FIG. 4. In the event of a fault or jam in the conveyor, the increased resistance to the movement of the bar 25 will cause it to rotate in its bearing pads 47, and so cause pivotal movement of a metal blade 52 attached to the end of each bar 25. The blades 52 act as optical "shutters" or interposers in an optical fault detection system illustrated in FIGS. 5 and 6.

When any of the pusher bars 25 is rotated the interposer blade 52 moves downwards as indicated at 54 in FIG. 5, into the path of an optical beam 55 projected horizontally below and to one side of the dead plate 40 by a light projector 57. The beam is directed along the length of the conveyor to a photo-cell optical receiver 58 at the other end, and it will be seen that if any one of a number of interposer blades 52 moves downwards to intercept the light beam the system will indicate a failure. The optical receiver 58 is connected to suitable electric circuitry for providing a visible or audible warning and for immediately interrupting the drive to the conveyor.

FIG. 6 illustrates geometrically the movement of the interposer blades 52 as they pass around the right-hand end sprockets 24 of one of the conveyor sections, and this illustrates the factors governing the choice of various dimensions and relationships such as the vertical position of the optical beam. It will be noted that although each of the interposer blades 52 may remain in its normal undeflected attitude throughout its movement, during the lower part of its rotational movement at the extremity of the conveyor section, the locus or path 60 of the extreme tip 61 of the blade will drop to a level 63 appreciably below the normal level 62 of the blade during the horizontal run. In this angular travel the interposer blade 52 will interfere with any optical beam positioned within the vertical range D in FIG. 6. For the optical system to operate as a detection unit therefore it is necessary to ensure that any rotation of a pusher bar 25, which requires a fault detection output signal, will move the prospective interposer blade 52 below this vertical range D into the region $t$ where the beam 55 is located. This can be achieved either by slightly increasing the length of the interposer blade or by increasing the operating angle $\theta$ through which the blade will rotate. Unfortunately increase in the interposer blade length gives an increased radius of the locus of the blade tip 61 and so further increases the interference sector, so that the position of the optical beam must be lowered even further. In fact it can be shown that there is an optimum length for the interposer blade to give the minimum operating angle $\theta$, which can be calculated mathmetically.

The sensitivity of the system is preferably high enough to allow detection of a thin letter trapped beneath a pusher bar as shown at 65 in the right hand part of FIG. 5. A particular advantage of the system is that maximum sensitivity occurs at the point of maximum interference as shown at 66 in FIG. 6. It is at this point where faults, if any, are most likely to occur, as a mistimed letter entering the conveyor would deflect the pusher bar 25 at approximately this point. Therefore the quickest and most effective response is obtained at this more critical part of the machine cycle.

In a possible alternative system means may be provided for inhibiting or otherwise rendering inoperative the optical detection system 57, 58, during the interference period of each of the interposer blades 52. This can be achieved electrically by applying suitable electronic gating logic to the electrical output circuit associated with the optical receiver.

I claim:

1. Sorting apparatus, for sorting articles of mail, documents, or the like, comprising a row of sorting stations to receive sorted articles, a deflector gate at each station, an endless conveyor for moving articles in a path having a straight section extending along the said row of sorting stations, the said conveyor including spaced pusher members to engage individual articles to be sorted, and means for detecting operating faults of said apparatus, comprising an optical projector arranged to project a beam of light parallel with and adjacent to said straight section of said conveyor, an optical receiver on which said beam impinges, means for producing an output signal in response to variations in the light received by the receiver, and a plurality of optical impeders mounted on said conveyor and movable therewith lengthwise along said straight section, each impeder being movable also transversely relative to said conveyor between beam obstructing and non-obstructing positions, in response to relative movement of a part of said conveyor caused by malfunction thereof.

2. Sorting apparatus according to claim 1, wherein each optical impeder is attached respectively to one of said pusher members on said conveyor.

3. Sorting apparatus according to claim 2, wherein each pusher member is pivotally mounted on said conveyor, to move relative thereto in a direction having a component of direction parallel with the length of said conveyor and each optical impeder is connected to the respective pusher member to move in a direction having a component of direction transverse to the length of said conveyor.

4. Sorting apparatus according to claim 1, wherein each of said optical impeders is arranged to move lengthwise with said conveyor along substantially the full length of said straight section of said conveyor.

5. Sorting apparatus for sorting articles of mail or documents, comprising a plurality of separate modular sorting units, arranged horizontally in alignment and operatively interconnected to provide an integrated sorting system, each said modular unit comprising sorting apparatus in accordance with claim 4, and wherein said straight sections of the conveyors of adjacent modular units are aligned lengthwise, and arranged to transfer articles to be sorted from one conveyor to the next adjacent conveyor.

6. Sorting apparatus according to claim 1, wherein said articles to be sorted lie horizontally flat on said conveyor, and wherein said optical impeders are located, in one of said operating positions, in vertical planes transverse to the length of said straight section of the conveyor.

* * * * *